United States Patent [19]

Mülhaupt et al.

[11] Patent Number: 4,908,406
[45] Date of Patent: Mar. 13, 1990

[54] CURABLE MIXTURE

[75] Inventors: Rolf Mülhaupt, Marly, Switzerland; Hubert Simon, Mulhouse, France; Jacques-Alain Cotting, Düdingen, Switzerland

[73] Assignee: Ciba-Geigy Corporation, Ardsley, N.Y.

[21] Appl. No.: 290,112

[22] Filed: Dec. 27, 1988

[30] Foreign Application Priority Data

Jan. 14, 1988 [CH] Switzerland .................. 125/88-4

[51] Int. Cl.$^4$ ............................................ C08B 18/10
[52] U.S. Cl. ........................................ 525/64; 525/66; 156/331.4; 156/331.7; 528/60; 528/73
[58] Field of Search ............... 525/64, 66; 156/331.4, 156/331.7; 528/60, 73

[56] References Cited

U.S. PATENT DOCUMENTS 4,374,953  2/1983  Chou et al. .................. 525/153
4,412,033 10/1983  LaBelle et al. ............... 524/590
4,496,706  1/1985  Chang ......................... 528/57

*Primary Examiner*—Maurice J. Welsh
*Attorney, Agent, or Firm*—Luther A. R. Hall

[57] ABSTRACT

Curable mixtures, comprising
(a) a cycloaliphatic polyol of the formula I

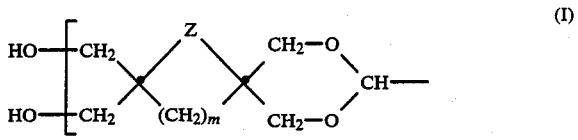

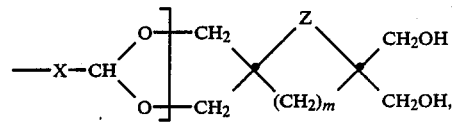

in which z is

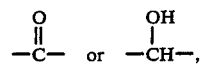

m is a number from 2 to 5, n is zero or a number from 1 to 10 and X is a direct bond or an aliphatic or cycloaliphatic radical, and
(b) a prepolymeric polyhydroxy compound blocked by an aliphatic or cycloaliphatic diisocyanate, are advantageously suitable for producing adhesive bonds and seals having high tensile shear strengths.

11 Claims, No Drawings

CURABLE MIXTURE

The present invention relates to a curable mixture comprising a cycloaliphatic polyol and a prepolymeric polyhydroxy compound blocked by an aliphatic or cycloaliphatic diisocyanate.

German Offenlegungsschrift No. 3,140,884 discloses curable polyurethane compositions which consist of a prepolymer blocked by an isocyanate, an aliphatic polyol and a metal-organic or metal salt catalyst.

The curable polyurethane composition disclosed in EP-A-No. 0,124,753 also contains specific curing catalysts for curing.

It has now been found that, when certain cycloaliphatic polyols are used as curing agents for prepolymers blocked by aliphatic or cycloaliphatic diiso- cyanates, the use of a curing accelerator or curing catalyst is unnecessary. The adhesive bonds produced from the curable mixtures according to the invention are, in addition, distinguished by a particularly high tensile shear strength.

The present invention thus relates to a curable mixture comprising (a) a cycloaliphatic polyol of the formula I

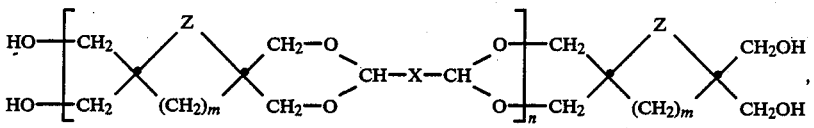

in which Z is

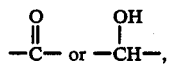

m is a number from 2 to 5, n is zero or a number from 1 to 10 and X is a direct bond or an aliphatic or cycloaliphatic radical, and (b) a prepolymeric polyhydroxy compound blocked by an aliphatic or cycloaliphatic diisocyanate.

In the curable mixture, the equivalent ratio of primary and, if appropriate, secondary OH groups to isocyanate groups is in general from 0.9 to 1.1, i.e. components (a) and (b) are present in approximately stoichiometrical quantities.

In the formula I, Z is preferably the radical

Moreover, m is preferably the number 2 or 3 and n in the formula I is preferably zero or a number from 0.1 to 3.

The radical X in the formula I, which is derived from a dialdehyde or diketone, is preferably a direct bond or an aliphatic or cycloaliphatic radical containing up to 20 C atoms. In particular, X is a direct bond or an aliphatic radical having up to 12 C atoms.

Examples of suitable compounds of the formula I, in which z is zero, are 2,2,6,6-tetramethylolcyclohexan-1-ol, 2,2,6,6-tetramethylolcyclohexan-1-one, 2,2,5,5-tetramethylolcyclopentan-1-ol or 2,2,5,5-tetramethylolcyclopentan-1-one.

Compounds of the formula I in which n is the number 1 or a number greater than 1 are known and can be prepared in a known manner by the process dis-closed for example, in U.S. Pat. No. 4,374,953, by polycondensing a polyol of the formula II

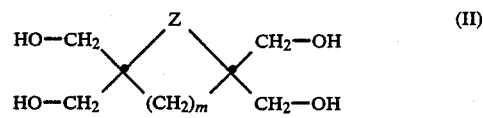

in which Z and m are as defined in the formula I, with an aliphatic or cycloaliphatic dialdehyde or aliphatic or cycloaliphatic diketone to give a polycycloacetal or polycycloketal, containing hydroxyl groups, of the formula I.

Examples of suitable polyols of the formula II are the abovementioned polyols of the formula I, in which n is zero. Examples of dialdehydes or diketones suitable for the process are glyoxal, glutaraldehyde, succinaldehyde and 1,4-cyclohexanedione.

The polycondensation of the polyol of the formula II with the dialdehyde or diketone to give the polycycloacetal, containing hydroxyl groups, of the formula I takes place preferably in an inert organic solvent, for example toluene, with an acid catalyst, for example in the presence of $H_3PO_2$, and with simultaneous removal of water from the reaction mixture.

In the curable mixtures according to the invention, the cycloaliphatic polyols of the formula I used are also preferably those which have a softening point of 60° to 180° C., preferably between 80° and 140° C.

The prepolymeric polyhydroxy compounds which are used as component (b) in the curable mixture according to the invention and are blocked by certain diisocyanates have an average isocyanate functionality of at least 2, preferably from 2 to 3, and are obtained in the known manner by addition of an aliphatic or cycloaliphatic diisocyanate to a prepolymeric polyhydroxy compound, 1 mole of diisocyanate being employed per 1 hydroxy equivalent of the polyhydroxy compound.

Examples of suitable aliphatic or cycloaliphatic diisocyanates are hexamethylene 1,6-diisocyanate, methyl 2,6-diisocyanatohexanoate, 1-methyl-2,4-diisocyanatohexane, 2,2,4-trimethyl-1,6-diisocyanatohexane, 1-isocyanato-3,5,5-trimethyl-5-isocyanatomethylcyclohexane (isophorone diisocyanate), 1-methyl-2,4-diisocyanatocyclohexane, 4,4-diisocyanatodicyclohexylmethane and 4,4'-diisocyanato-3,3-dimethyldiphenyl.

Preferably, cycloaliphatic diisocyanates, in particular isophorone diisocyanate, are used for blocking the prepolymeric polyhydroxy compounds.

In the context of the subject of the present invention, a prepolymeric polyhydroxy compound is to be understood as meaning prepolymers which have at least two recurring structural elements in the molecule and are terminated by hydroxyl groups. The prepolymer can be linear or slightly branched. Preferably, the prepolymeric polyhydroxy compound is linear and has preferably a number average molecular weight from 150 to 10,000, especially from 500 to 3,000.

Prepolymeric polyhydroxy compounds are known and can be condensation polymers or addition polymers. Examples of such compounds are hydroxy-terminated polyethers, polyesters, polycaprolactones, polyurethanes and polybutadienes. These hydroxy-terminated prepolymers are preferably employed for preparing component (b). In particular, hydroxy-terminated polycaprolactone is used for preparing a prepolymeric polyhydroxy compound blocked by a diisocyanate.

Examples of hydroxy-terminated polyethers as prepolymeric polyhydroxy compounds are polyalkylene ether-polyols, which are obtained by anionic polymerization, copolymerization or block copolymerization of alkylene oxides, such as ethylene oxide, propylene oxide or butylene oxide, with difunctional or polyfunctional alcohols such as 1,4-butanediol, 1,1,1-trimethylolethane, 1,1,1-trimethylolpropane, 1,2,6-hexanetriol, glycerol, pentaerythritol or sorbitol, or with amines such as methylamine, ethylenediamine or 1,6-hexylenediamine, as starter components or by cationic polymerization or copolymerization of cyclic ethers such as tetrahydrofuran, ethylene oxide or propylene oxide with acid catalysts such as $BF_3$. etherate, or by polycondensation of glycols which can be polycondensed with elimination of water, such as 1,6-hexanediol, in the presence of acid etherification catalysts such as p-toluenesulfonic acid. Alkoxylation products of phosphoric acid or phosphorous acid with ethylene oxide, propylene oxide, butylene oxide or styrene oxide can also be used.

Examples of hydroxy-terminated polyesters as prepolymeric polyhydroxy compounds are polyesters which can be obtained by polycondensation of dicarboxylic or polycarboxylic acids, for example adipic acid, sebacic acid, azelaic acid, dimeric and trimeric fatty acids, phthalic acid, isophthalic acid, terephthalic acid, tetrahydrophthalic acid, hexahydrophthalic acid and endomethylenetetrahydrophthalic acid, with diols or polyols, for example ethylene glycol, 1,4-butanediol, 1,6-hexanediol, di-, tri- and tetraethylene glycol, di-, tri- and tetra-propylene glycol, di-, tri- and tetra-butylene glycol, 2,2-dimethylpropane-1,3-diol, 1,1,1-trimethylolpropane, 1,1,1-trimethylolethane and 1,2,6-hexanetriol.

The abovementioned hydroxy-terminated polyethers and polyesters are known compounds (cf. for example German Offenlegungsschrift No. 2,152,606 or "Kunststoff-Handbuch [Plastics Handbook]", Hanser-Verlag, 1983, page 16).

Moreover, hydroxy-terminated polycaprolactones, such as are obtained by ring-opening polymerization of, for example, ε-caprolactone or methyl-ε-caprolactone with titanium catalysts in the presence of a diol or triol, preferably a diol, as starter, are also suitable as prepolymeric polyhydroxy compounds. Such hydroxy-terminated polycaprolactones are known (cf. Kunststoff-Handbuch [Plastics Handbook], Hanser-Verlag, volume 7, 1983, pages 17 and 56), and some of them are commercially available, for example as "Niax ® 310", a product from UCC.

Hydroxy-terminated polyurethanes and processes for preparing them are also known, for example from "Kunststoff-Handbuch [Plastics Handbook]", Hanser-Verlag, 1983, pages 19 and 20. Such compounds are obtained, for example, by reacting n mole of a diisocyanate with n+1 mole of a diol with polyaddition, if appropriate in the presence of a catalyst. To prepare the polyurethanes, containing hydroxyl groups, as prepolymeric polyhydroxy compounds, aliphatic and cycloaliphatic as well as aromatic diisocyanates can here be used, for example 2,4-diisocyanatotoluene and its technical mixtures with 2,6-diisocyanatotoluene, 2,6-diisocyanatotoluene, 1,5-diisocyanatonaphthalene, 4,4'-diisocyanatodiphenylmethane and technical mixtures of various diisocyanatodiphenylmethanes, such as the 4,4'- and 2,4-isomers, urethanized 4,4'-diisocyanatodiphenylmethane, carbodiimidized 4,4'-diisocyanatodiphenylmethane, the uretdione of 2,4-diisocyanatotoluene, triisocyanatotriphenylmethane, the adduct of diisocyanatotoluene and trimethylolpropane, the trimer of diisocyanatotoluene, diisocyanato-m-xylene and N,N'-di-(4-methyl-3-isocyanatophenyl)-urea.

Polybutadienes which contain hydroxyl groups and which can be used as prepolymeric polyhydroxy compounds for preparing component (b) are likewise known and, in some cases, commercially available.

The mixtures according to the invention can be prepared in a manner known per se by blending or mixing in an inert organic solvent, for example dichloromethane, dimethylformamide or methyl ethyl ketone, preferably by blending, by dispersing the cycloaliphatic polyol of the formula I (component a) in the prepolymeric polyhydroxy compound (component b) blocked by a diisocyanate.

It has also been found that a mixture according to the invention, containing components (a) and (b), can be fully cured faster at comparatively the same curing temperature, for example between 120° and 160° C., if a polybutadiene graft copolymer is added as an additional component (c) to the mixture according to the invention. The coatings or adhesive bonds produced from such mixtures have comparatively equally good properties.

The present invention therefore also relates to a curable mixture which additionally comprises a polybutadiene graft copolymer as component (c), apart from components (a) and (b).

The mixture according to the invention can contain up to 30% by weight of component (c), relative to the total quantity of components (a) and (b). Preferably, the proportion of component (c) in the mixture according to the invention is 5 to 15% by weight.

Polybutadiene graft copolymers (c) are to be understood as meaning copolymers based on butadiene and at least one polar, ethylenically unsaturated comonomer.

Examples of polar, ethylenically unsaturated comonomers are acrylic acid, methacrylic acid, esters of acrylic or methacrylic acid, for example the methyl or ethyl esters, amides of acrylic or methacrylic acid, fumaric acid, itaconic acid, maleic acid or esters or halfesters thereof, for example the monomethyl or dimethyl esters, or maleic anhydride or itaconic anhydride; vinyl esters, for example vinyl acetate, polar styrenes such as styrenes chlorinated or brominated in the nucleus, or especially acrylonitrile or methacrylonitrile.

In addition to polar, ethylenically unsaturated comonomers, component (c) can also contain further nonpolar, ethylenically unsaturated comonomers. Examples of these are ethylene, propylene or especially styrene or substituted styrenes, such as vinyltoluene.

Component (c) can be solid, especially pulverulent, or preferably liquid. It can also represent thermoplastics, thermoplastic elastomers or elastomers.

Preferred compounds for component (c) are graft copolymers based on butadiene/acrylonitrile, butadiene/acrylonitrile/styrene copolymers (ABS), especially ABS powders, and methyl methacrylate/styrene/butadiene graft copolymers (MBS).

Curing of the mixtures according to the invention takes place at elevated temperatures. In general, curing temperatures between 80° and 180° C., preferably between 100° and 140° C., are applied. If desired, curing of the mixtures according to the invention can also be carried out in the presence of curing catalysts conventional in polyurethane chemistry. The following are examples of such catalysts: diazabicyclooctane, dibutyltin dilaurate or tin(II) octoate. These catalysts are employed in the usual quantities, for example in quantities of 0.001–2% by weight, relative to the quantity of diisocyanate or polyisocyanate.

Moreover, the mixtures according to the invention can be provided before curing with the conventional additives. As conventional additives, they can contain plasticizers, extenders, fillers and reinforcing agents, for example bituminous coal tar, bitumen, textile fibres, glass fibres, asbestos fibres, boron fibres, carbon fibres, mineral silicates, mica, powdered silica, hydrated alumina, bentonites, kaolin, silica aerogel or metal powders for example aluminium powder or iron powder, and also pigments and dyes, such as carbon black, oxide pigments and titanium dioxide, flame-proofing agents, thixotropic agents, flow control agents, such as silicones, waxes and stearates, some of which are also used as mould-release agents, adhesion promoters, antioxidants and light stabilizers.

The mixtures according to the invention can be used, for example, as adhesives, adhesive films, matrix resins, surface coatings or sealing compounds or, quite generally, for the production of cured products. They can be used in a formulation adapted to the particular specific field of application, in the unfilled or filled state, for example as paints, coating compositions, surface coatings, moulding compositions, dipping resins, casting resins, impregnating resins, laminating resins, matrix resins and adhesives.

Preferably, the mixtures according to the invention are used for producing adhesive bonds, seals or coatings. The invention also relates to the shaped products obtained by curing the mixtures according to the invention, in particular adhesive bonds, seals or coatings.

PREPARATION OF THE STARTING SUBSTANCES

A. Cycloaliphatic polyol A

Polycondensation of 100 g (0.453 mol) of 2,2,6,6-tetramethylolcyclohexan-1-ol with 41.26 g (0.411 mol) of glutardialdehyde at 85° C. under 650 mbar produces a polycycloacetal containing hydroxyl groups (cycloaliphatic polyol A) and having a softening point of 78° C. and an OH equivalent content of 10.64 equivalents/kg. The compound is of the following formula

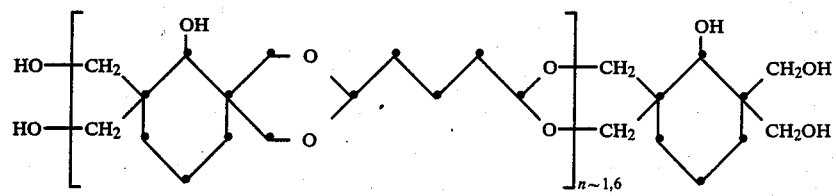

B. Cycloaliphatic polyol B

Polycondensation of 220.3 g (1 mol) of 2,2,6,6-tetramethylolcyclohexan-1-ol with 29.02 g (0.5 mol) of glyoxal at 68° C. under 350 mbar produces a polycycloacetal (cycloaliphatic polyol B) having a softening point of 87° and an OH equivalent content of 17.9 equivalents/kg. The resulting compound is of the following formula

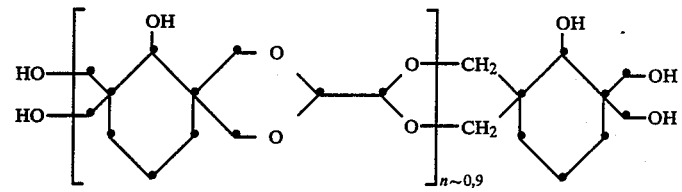

I. Polycaprolactonetriol blocked by isophorone diisocyanate (termed prepolymer I below)

103 g of isophorone diisocyanate and 116 g of Niax ® 310 (hydroxy-terminated polycaprolactonetriol having an OH number of 187; commercial product from UCC) are stirred under nitrogen at 100° C. until the resulting prepolymer has reached an isocyanate content of 10.3% by weight.

EXAMPLE 1

20 g of prepolymer I are mixed with 3.27 g of 2,2,6,6-tetramethylolcyclohexan-1-ol and 1 g of Aerosil ® 380 (pyrogenic silica; commercial product from Degussa). The gelling times ('=minutes, ''=seconds) of this mixture are determined on a hotplate at various temperatures.

|  | Gelling time |
| --- | --- |
| 120° C. | 22'36'' |
| 140° C. | 11'53'' |
| 60° C. | 5'29'' |

The tensile shear strengths according to DIN 53283 are measured on adhesive bonds between identical substrates, the adhesive bonds having been cured under the same conditions for 2 hours at 140° C.

| | Tensile shear strength [N/mm²] |
|---|---|
| degreased, sandblasted aluminium | 18.6 |
| degreased steel | 18.4 |
| glass-reinforced polyester | 17.9 |

EXAMPLE 2

20 g of prepolymer I are mixed with 3.27 g of 2,2,6,6-tetramethylolcyclohexan-1-ol, 2.3 g of Novodur ® A90 (ABS powder; commercial product from BAYER) and 1 g of Aerosil ® 380, and the gelling times are determined as in Example 1.

| | Gelling time |
|---|---|
| 120° C. | 18'16" |
| 140° C. | 5'35" |
| 160° C. | 3'55" |

Adhesive bonds are produced as in Example 1, and their tensile shear strength is determined according to DIN 53283.

| | Tensile shear strength [N/mm²] |
|---|---|
| degreased, sandblasted aluminium | 19.3 |
| degreased steel | 19.1 |
| glass-reinforced polyester | 17.9 |

EXAMPLE 3

20 g of prepolymer I are mixed with 2.28 g of 2,2,5,5-tetramethylolcyclopentan-1-one and 1 g of Aerosil ® 380, and the gelling times of these mixtures are determined.

| | Gelling time |
|---|---|
| 140° C. | 1h 37' |
| 160° C. | 37'05" |

Adhesive bonds are produced as in Example 1, and their tensile shear strength is determined according to DIN 53283.

| | Tensile shear strength [N/mm²] |
|---|---|
| degreased, sandblasted aluminium | 11.1 |
| degreased steel | 11.3 |

EXAMPLE 4

Mixtures of the substances indicated below are prepared, their gelling times are determined, and they are used as in Example 1 for adhesively bonding degreased, sandblasted aluminium and degreased steel.

| | Mixture 4a | Mixture 4b |
|---|---|---|
| Cycloaliphatic polyol A | 8.23 g | 4.6 g |
| Prepolymer I | 20.0 g | 20.0 g |
| Aerosil ® 380 | 1.0 g | 1.0 g |
| | Gelling times | |
| 140° C. | 20' | 35' |
| 160° C. | 7'47" | 12'10" |
| | Tensile shear strengths [N/mm²] | |
| Aluminium | 19.4 | 12.0 |
| Steel | 22.3 | 11.5 |

EXAMPLE 5

20 g of prepolymer I are mixed with 4.7 g of the cycloaliphatic polyol B and 1 g of Aerosil ® 380, the gelling times of this mixture are determined, and it is used as in Example 1 for adhesive bonding of degreased, sandblasted aluminium and degreased steel.

| | Gelling times |
|---|---|
| 140° C. | 1h 7'43" |
| 160° C. | 25' |

| | Tensile shear strengths [N/mm²] |
|---|---|
| Aluminium | 6.4 |
| Steel | 9.1 |

What is claimed is:

1. A curable mixture, comprising
   (a) a cycloaliphatic polyol of the formula I

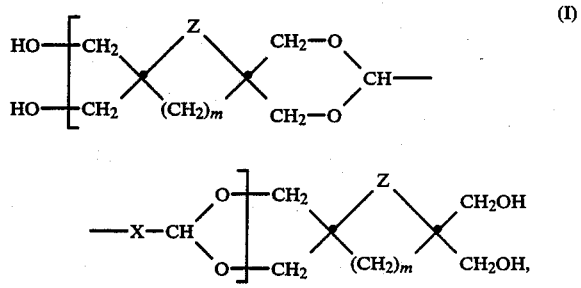

(I)

in which Z is

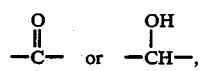

m is a number from 2 to 5, n is zero or a number from 1 to 10 and X is a direct bond or an aliphatic or cycloaliphatic radical, and
   (b) a prepolymeric polyhydroxy compound blocked by an aliphatic or cycloaliphatic diisocyanate.

2. A mixture according to claim 1, wherein Z in the formula I is

3. A mixture according to claim 1, wherein m in the formula I is 2 or 3 and n is zero or a number from 0.1 to 3.

4. A mixture according to claim 1, wherein the cycloaliphatic polyol of the formula I has a softening point from 60° to 180° C., preferably from 80° to 140° C.

5. A mixture according to claim 1, wherein the component (b) is a prepolymeric polyhydroxy compound blocked by a cycloaliphatic diisocyanate.

6. A mixture according to claim 1, wherein the prepolymeric polyhydroxy compound blocked by an aliphatic or cycloaliphatic diisocyanate is derived from a hydroxy-terminated polyether, polyester, polycaprolactone, polyurethane or polybutadiene.

7. A mixture according to claim 6, wherein the prepolymeric polyhydroxy compound blocked by an aliphatic or cycloaliphatic diisocyanate is derived from a hydroxy-terminated polycaprolactone.

8. A mixture according to claim 1, containing a polybutadiene graft copolymer as component (c) in addition to components (a) and (b).

9. A mixture according to claim 8, containing an acrylonitrile/butadiene/styrene graft copolymer as component (c).

10. A process for producing adhesive bonds, seals or coatings, which comprises curing a mixture according to claim 1 as an adhesive bond, a seal or coating in the temperature range from 80° to 180° C.

11. The adhesive bond, seal or coating obtained by the process according to claim 10.

* * * * *